United States Patent [19]
Linsenbardt et al.

[11] Patent Number: 5,980,995
[45] Date of Patent: Nov. 9, 1999

[54] METHOD FOR PRODUCING AN INSULATED METALLIC STRIP

[75] Inventors: Thomas L. Linsenbardt, Lohman; Norris L. Hill, New Bloomfield, both of Mo.; Hoan Duy Le, Cary, N.C.

[73] Assignee: ABB Power T&D Company Inc., Raleigh, N.C.

[21] Appl. No.: 09/233,269

[22] Filed: Jan. 19, 1999

Related U.S. Application Data

[62] Division of application No. 08/802,694, Feb. 19, 1997.

[51] Int. Cl.$^6$ ....................................................... C08J 7/04
[52] U.S. Cl. ......................... 427/504; 427/116; 427/178; 427/210; 427/261; 427/272; 427/282; 427/287; 427/295; 427/318; 427/327; 427/510; 427/552; 427/558; 427/559
[58] Field of Search ..................................... 427/210, 504, 427/510, 261, 272, 282, 287, 318, 327, 295, 178, 552, 558, 559, 116

[56] References Cited

U.S. PATENT DOCUMENTS

| | | | |
|---|---|---|---|
| 5,359,874 | 11/1994 | Buckley et al. | 72/256 |
| 5,406,818 | 4/1995 | Linsenbardt et al. | 72/37 |
| 5,528,820 | 6/1996 | Collier | 29/605 |

OTHER PUBLICATIONS

Vacumat With UV Curing System—Reproduced from "Supply Lines" brochure published by E&R System Technik, Inc., Springfield, MA No Date Available.

"Jan. 19, 1999 Vacuum Coating Eliminates Waste, Emission," Furniture Design & Manufacturing, Nov. 1992.

*Primary Examiner*—Bernard Pianalto
*Attorney, Agent, or Firm*—Woodcock Washburn Kurtz Mackiewicz & Norris LLP

[57] ABSTRACT

An insulated metallic strip suitable for use in the coils of power transformers and method of producing the same. Following the extrusion of a flat metallic strip of conductive material for winding into a magnet coil, the flat strip having a predetermined thickness and first and second sides bounded by a pair of fully rounded edges, the method of insulating the strip of conductive material by supporting the flat strip in a level state at a predetermined temperature in a vacuum chamber and while in the vacuum chamber applying a liquid coating of resin to the entire first side of the strip and the pair of rounded edges and extending onto the second side of the strip from each of the edges a distance at least as great as about 0.25" to prevent turn to turn discharge. Applying a liquid coating of resin to the second side of the strip at a plurality of spaced areas between the coating extending around the edges, controlling the placement and thickness of the resin coating on the strip and curing the liquid coating of resin. A flat metallic strip of conductive material coated according to this method is also disclosed.

15 Claims, 3 Drawing Sheets

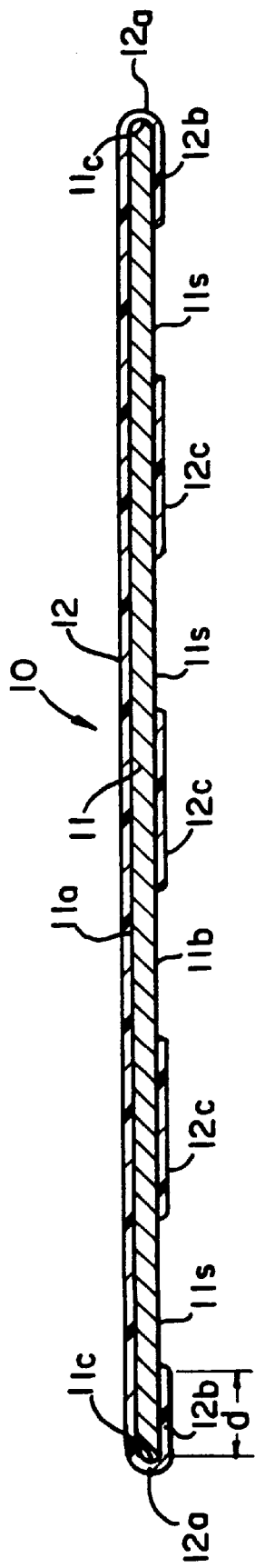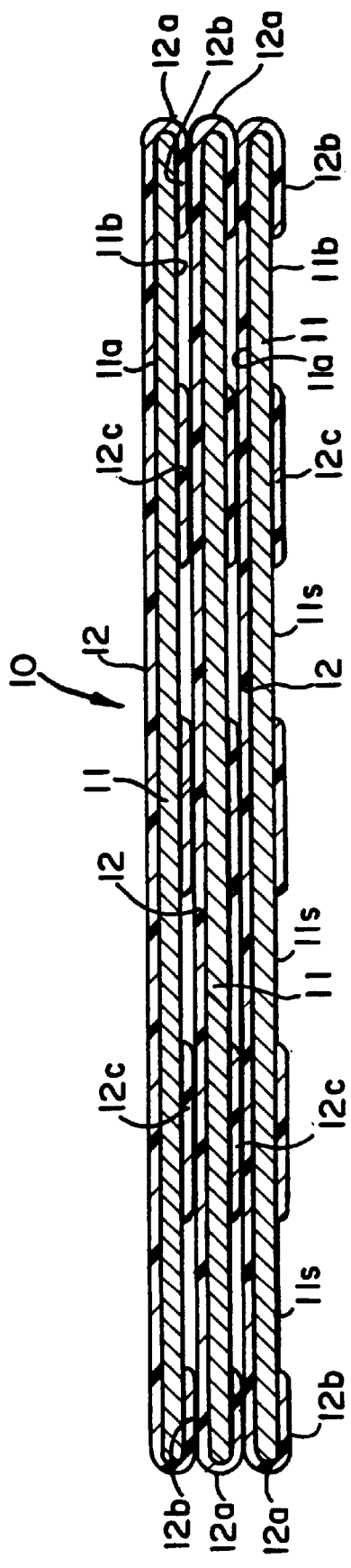

METHOD FOR PRODUCING AN INSULATED METALLIC STRIP

This Application is a divisional of application Ser. No. 08/802,694, filed Feb. 19, 1997.

BACKGROUND OF THE INVENTION

This invention relates to the production of insulated metallic strip and, more particularly, to the production of insulated metallic strip suitable for use in the coils of power transformers. Strip is typically, any material whose width is at least 30 times greater than the thickness.

Power transformers, such as overhead distribution transformers and padmounted distribution transformers, generally include coils which are wound from relatively wide flat metallic strips of conductive material such as aluminum. Heretofore, the aluminum strips have been produced by first casting aluminum into ingots and then cold rolling and hot rolling the ingots to form sheets which are then slit to form the strips. In addition, the strips have been subjected to secondary metal treating processes to contour the edges thereof. Contoured edges enable the strips to be insulated with a dielectric in an optimal manner. More recently, there has been developed an improved process for the production of continuous metal strip employing continuous extrusion techniques to continuously form flat metal strip suitable for producing coils for power transformers. Such improved method known as the "Conform" process and the apparatus for practicing the Conform process is disclosed in U.S. Pat. Nos. 5,359,874 and 5,406,818. Briefly, in that process, twin metal billets are fed to dual circumferential grooves formed in a rotating wheel. The billets are advanced first to a wedge-shaped gap which deforms the billets and they are then advanced to a die. The die has a die opening with a circumferentially discontinuous, annular cross-section. The metal from each billet merges in the die opening and exits therefrom in the form of a slit tube. The tube is then opened and flattened to form a flat strip by advancing the slit tube over a forming member having a progressively increasing width.

In manufacturing transformer coils, the coils are wound from continuous metal strip with interleaved layers of insulation material. In conventional transformers the insulation material are layers of insulating paper. The paper provides electrical insulation between the layers or turns of the wound conductor material. An adhesive is applied to the paper before it is wound into the transformer and the wound transformer is thereafter heated and the adhesive on the paper binds the metallic conductor turns and the paper turns together into a solid unit. The paper is typically five mils thick and thus adds considerably to the size and bulk of a transformer having many turns. This increase in size requires a larger housing for the transformer and also adds to the cost of manufacturing, shipping and installing the transformers.

It would be desirable to have strip conductors for winding into the coils of the transformer where the strip conductors are provided with an insulating coating so as to eliminate the need for the paper layers between the metallic layers of the coil. Such an arrangement has been disclosed in U.S. Pat. No. 5,528,820. In that patent there is disclosed a stock material for winding into a magnet coil which includes a running length of conductive aluminum metal having a cross section that has first and second long sides and two short sides. The long sides and the short sides meet at corners which are substantially free of jagged edges and sharp corners. An insulating epoxy polymer coating about 0.001" thick uniformly covers the first long side and the short sides, with the second long side being substantially free of the insulating coating. A heat-activatable adhesive is arranged non-continuously on one of the long sides. While this type of strip conductor for transformers has eliminated the need for the intervening layer of paper strip material, it has left something to be desired.

It would be desirable to provide a flat metallic strip of conductive material with rounded edges for winding into a magnet coil having an insulating coating on one side and on the pair of edges of the strip and extending onto the second side of the strip from each of the edges a distance at least as great as to prevent turn to turn discharge. This distance is critical and provides increased turn to turn "creep" distance where creep is defined as the discharge of electricity across a solid surface. It would also be desirable to provide a plurality of spaced areas of the insulating coating on the second side between the insulating coating extending around the edges to allow the strip to wind into coils without "dishing", sometimes referred to as "canoeing", and the bare stripes between the insulation coating allow the strip to be cold pressure welded to leads and taps without the need to remove the coating. The term "dishing" is defined as the occurrence of a non-flat surface across the outside cylindrical surface of the wound coil due to non-uniform thickness of the individual strip material windings. "Dishing" occurs when the edges of the strip are thicker than the middle and when the strip is wound into a tight coil, the coil has a larger diameter at its sides than it does in the middle. The edges of the strip will be stretched and when unwound the strip will have wavy edges.

It would also be desirable to produce the flat insulated strip in a continuous process where the insulating coating is applied immediately following the production of the flat metallic strip and there is little chance for contamination of the strip which is critical for the application of thin coatings.

SUMMARY OF THE INVENTION

Accordingly, the principle object of the invention is to provide a new and improved method of applying an insulating coating to a flat metallic strip of conductive material with rounded edges for winding into a magnet coil and the strip produced by such method.

In accordance with the present invention, there is provided a flat metallic strip of conductive material for winding into a magnet coil including a running length of the strip of predetermined thickness having first and second sides bounded by a pair of rounded edges. An insulting coating is provided on the first side and the pair of edges and extends onto the second side from each of the edges a distance at least as great as to prevent turn to turn discharge, and a plurality of spaced areas of the insulation coating is provided on the second side between the insulating coating extending around the edges.

In another aspect of the invention there is provided in a system for continuous extrusion of a flat metallic strip of conductive material for winding into a magnetic coil, the flat strip having a predetermined thickness and first and second sides bounded by a pair of rounded edges, the method of continuously insulating the strip of conductive material. The method comprises supporting the flat strip in a level state and preheating the strip to a predetermined temperature. The strip is then passed into a vacuum chamber where a liquid coating of resin is applied to the first side of the strip and to the pair of rounded edges and extending onto the second side of the strip from each of the edges a distance at least as great as to prevent turn to turn discharge. The method includes applying the coating of resin to the second side of the strip at a plurality of spaced areas between the insulation coating extending around the edges. The method further includes the step of controlling the placement of the resin coating on the strip, controlling the thickness of the resin coating applied to the surfaces of the strip and curing the liquid coating of resin. The coated strip is then wound into a coil.

For more detailed understanding of the invention and for further objects and advantages thereof, reference is to be had to the following description taken in conjunction with the accompanying drawings.

BRIEF DESCRIPTION OF THE DRAWINGS

FIG. 3 is a cross section of the insulated strip conductor shown in FIGS. 1 and 2.

FIG. 5 is a sectional view taken along the lines 5—5 in FIG. 4 showing a series of layers of the metallic insulated strip conductor in the magnet coil.

DETAILED DESCRIPTION OF THE PREFERRED EMBODIMENTS

Figure 1:
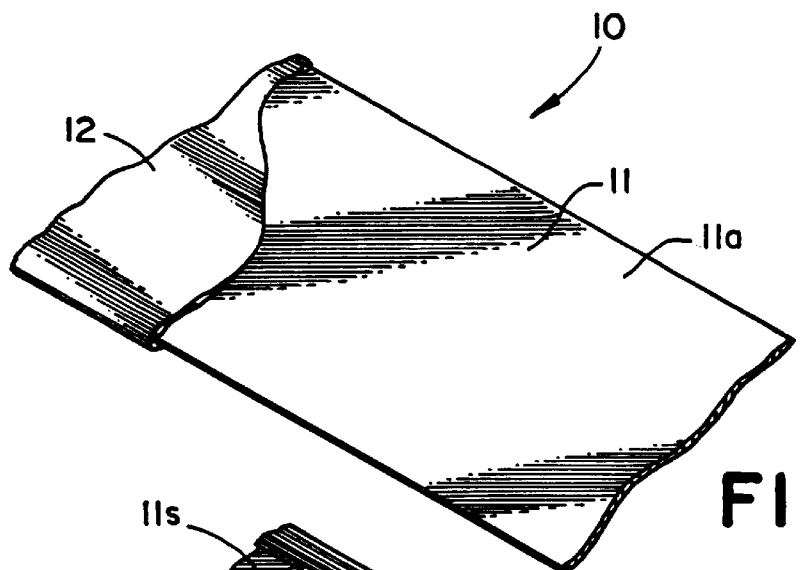
FIG. 1 is a top perspective view of a running length of flat metallic strip of conductive material for winding into a magnet coil insulated in accordance with the present invention.
Figure 2:
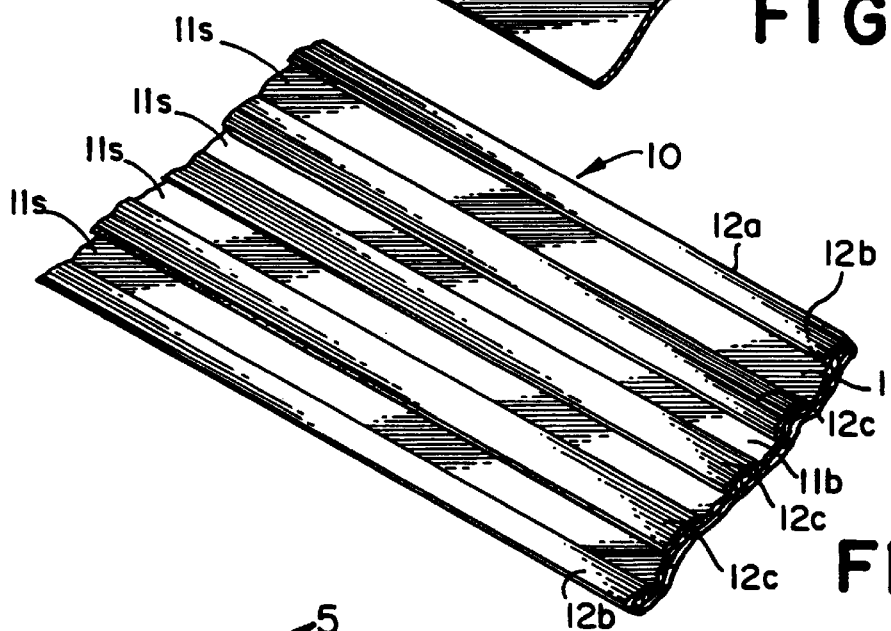
FIG. 2 is a bottom perspective view of the flat metallic insulated strip conductor shown in FIG. 1.

Referring to FIGS. 1–3 there is illustrated an insulated metallic strip 10 produced in accordance with the present invention. The insulated metallic strip 10 includes a running length of a flat metallic strip of conductive material 11 for winding into a magnet coil. The conductive strip material 11 may be of any suitable metal such as aluminum or copper and having a predetermined thickness typically within the range from 0.001" to 0.100". For transformer applications the width of the strip typically ranges from 3" to 30" with the thickness being typically about 0.040". The conductive strip 11 preferably is made from a method known as the "Conform" process as later to be described and the apparatus for practicing the Conform process is disclosed in U.S. Pat. Nos. 5,359,874 and 5,406,818. The strip 11 includes a first side 11a and a second side 11b bounded by a pair of rounded edges 11c. The term "rounded edges" is defined herein as meaning edges which are substantially free of jagged edges or burrs and sharp corners. An insulating coating 12 covers the first side 11a and the pair of edges 11c at 12a and extends onto the second side 11b from each of the edges 11c at 12b a distance "d" at least as great as about 0.25" to prevent turn to turn discharge. The second side 11b of the strip 11 is provided with a plurality of spaced areas 12c of insulating coating separated by bare stripes 11s between the insulating coating 12b extending around the edges of the strip 11. The plurality of spaced areas of insulating coating 12c on the second side 11b of the strip 11 are in the form of stripes extending longitudinally of the strip 11. These stripes 12c alternate with the bare stripes 11s. The edges 11c of the strip 11 are rounded so as to avoid damaging the insulating coating.

The insulating coating 12, 12a, 12b and 12c preferably is a fully cured ultraviolet resin coating having a thickness from about 0.00025" to about 0.00150", thick. By having the insulting coating 12–12b extend around the pair of edges 11c and onto the second side from each of the edges a distance at least as great as 0.25", the turn to turn discharge in a magnet coil is prevented. This is sometimes referred to as turn to turn "creep" distance where creep is defined as the discharge of electricity across a solid surface. By providing the second side 11b of the strip 11 with a plurality of spaced areas of insulating coating 12c between the insulating coating 12a, 12b, which extends around the edges, this construction allows the strip material to wind into coils without "dishing" or "canoeing" and the bare stripes 11s between the insulating coating areas allow the strip 10 to be cold pressure welded to leads and to taps without the need to remove the coating. As pointed out above the term "dishing" or "canoeing" refers to the occurrence of a non-flat surface across the outside cylindrical surface of the wound coil due to non-uniform thicknesses of the individual strip material windings. This occurs when the edges of the strip are thicker than the middle and when the strip is wound into a tight coil, the coil has a larger diameter at its sides than it does in the middle. The edges of the strip will be stretched and when unwound the strip will have wavy edges.

Figure 4:
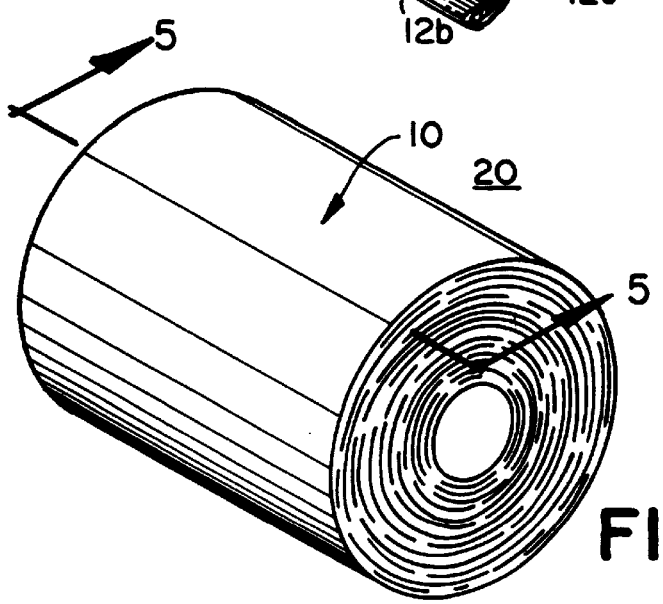
FIG. 4 is a perspective view of the flat metallic insulated strip conductor of the present invention wound into a magnet coil.

As may be seen in FIG. 4 the insulated metallic strip 10 has been wound into a magnet coil 20. The multiple layers of the insulated strip 10 in the coil 20 are best seen in FIG. 5. A continuous insulating coating 12 covers one side of the metallic strip 11 and extends around the edges 11c at areas 12a and onto the other side of the metallic strip 11b at areas 12b. By ensuring that the insulating coating 12a not only extends around the edges of the metallic strip 11 but onto the back surface a substantial distance at 12b and by placing a plurality of spaced insulating stripes 12c across the width of the strip material 10, there is eliminated any turn to turn discharge or creep and any dishing or canoeing of the strip material when wound into a coil 20 as shown in FIG. 4 while minimizing the amount of coating material required. By way of example, in one embodiment the conductor strip 11 had a width of about 8" and one side 11a and edges 11c had a uniform continuous insulating coating of a fully cured UV resin about 0.00075" thick. The insulation coating areas 12b on side 11b had a width of about 0.5". The three insulation coating areas 12c on side 11b each had a width of about 1" and the bare stripes between the insulation coating areas 12c had a width of about 1". By locating the spaced insulating coating areas on the side 11b of the metallic strip in the foregoing manner the adjacent turns in the coil were maintained level with respect to each other thus avoiding dishing or canoeing and at the same time providing bare areas of the metallic strip 11 to be cold pressure welded to leads and to taps without the need to remove any coating. This pattern of coating also is more economical than coating all surfaces of the metallic strip.

Figure 6:
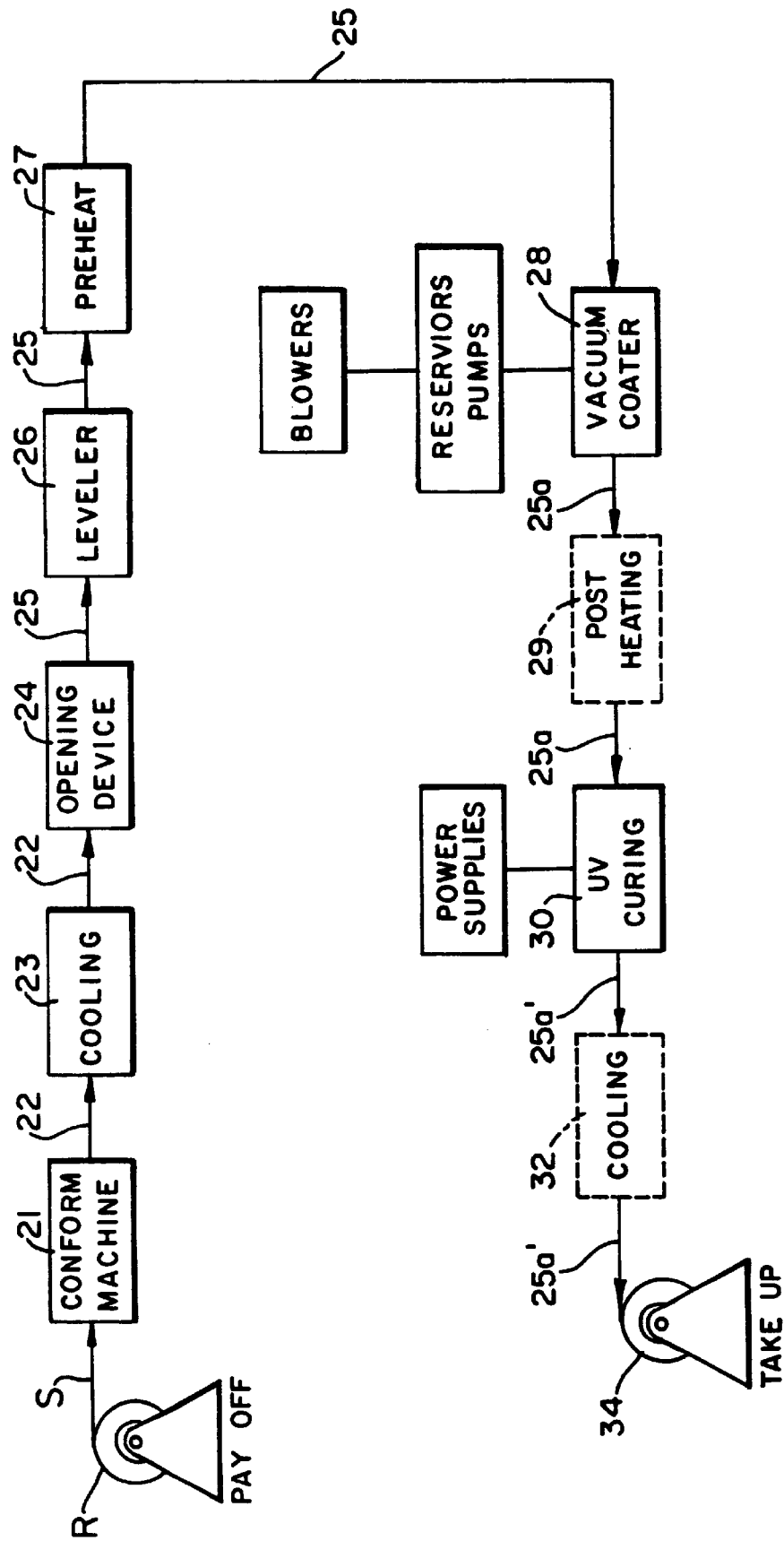
FIG. 6 is a schematic view of the process of forming the insulated strip conductor shown in FIGS. 1–3.

Referring to FIG. 6, there is illustrated a schematic view of the process of forming the insulated strip conductor 10 shown in FIGS. 1–5. As pointed out earlier, an improved process for the production of continuous metal strip employing continuous extrusion techniques to continuously form flat metal strips suitable for producing coils for power transformers is disclosed in U.S. Pat. Nos. 5,359,874 and 5,406,819. Those patents disclose the improved method known as the "Conform" process and the apparatus for practicing the Conform process. The disclosures in those patents are incorporated herein by this reference thereto. Briefly, round metal rod stock S from a supply coil R is fed in the form of billets into a Conform extruder 21 which forms the billets into a tube 22 having a slit. After exiting from the Conform extruder 21 the tube 22 is advanced into a cooling chamber 23 and then to an opening and flattening unit 24 in which the tube 22 is formed into a flat metal strip 25. The flat strip 25 is then advanced to a leveler 26 which functions to complete the flattening of the strip 25 and smooth out any unevenness so that the strip 25 as it exits the leveler 26 is substantially flat. As pointed out in the aforesaid patents the Conform process produces a large size range of metal strip continuously from standard size rod. This eliminates weld seams in the conductor and the strip produced has fully rounded or radiused edges.

The metal strip 25 in a level state preferably is preheated to about 100° F. to 150° F. at station 27. The metal strip 25 then enters a vacuum chamber 28 for the application of a thin insulating resin coating by a vacuum application system. The coating is applied immediately after the metal strip has been in the level state at the leveler 26. This has the advantage that the strip is still clean from the Conform extrusion and does not have time to get dirty and also that the residual heat from the Conform extrusion can be used to preheat the strip for the coating process. The preheat of the metal strip to about 100° F. to about 150° F. allows the insulating coating to flow out over the surface of the strip resulting in a thinner more uniform coating. It is preferable to install the heater 27 in the process line between the Conform extrusion and the vacuum coater 28 to allow better control of the strip preheat temperature. While the strip 25 is passing through the chamber 28 the liquid coating resin is sprayed or flowed over the surfaces to be coated. The inside of the chamber 28 is held at a pressure below atmospheric so that excess coating is pulled off the strip as the coated strip 25*a* exits the chamber. The vacuum application allows an insulating coating to be applied in one step that can be as thin as 0.00025". Control of the coating thickness is accomplished by adjustment of clearance around the strip where it exits the vacuum chamber, the speed of the strip through the vacuum chamber, and by control of the level of vacuum inside the vacuum application chamber 28. The vacuum application system is a compact and clean system with the coating material being contained and recirculated. It allows precise control of coating thickness as well as coating placement on the strip by the use of masks. A suitable vacuum coating system is the Schiele Vacumat System manufactured by Schiele in Germany and offered for sale by E & R System Technik, Inc., 85 St. George Road, Springfield, Mass. 01104. The Schiele Vacumat System is described in an article entitled "Vacuum Coating Eliminates Waste, Emissions", in Furniture Design & Manufacturing, November 1992 published by Delta Communications Inc. and in Supply Lines Brochure published by E & R System Technik, Inc.

After the coated strip 25*a* leaves the vacuum coater 28 depending upon its temperature, it may be heated if necessary at a post heating station 29 before entering the curing station 30. At the curing station 30, the insulating resin coating on the strip 25*a* is rapidly cured using ultraviolet radiation. The synthetic resin preferably used in this process as the coating is one that can be cured by rapid means such as by exposure to ultraviolet radiation or an electron beam. Of the curing methods, the ultraviolet curing is most desirable because of the lower equipment costs. An example of a suitable coating material is a multifunctional acrylate UV curable coating sold under the trademark DESOLITE® and manufactured by DSM Desotech, Inc., 1122 St. Charles Street, Elgin, Ill. 60120. The coating material can be formulated to fully cure upon exposure to the ultraviolet radiation or so that it is what is known in the trade as "Stage B" cured to a tack free state. If "Stage B" curing is chosen, the coating could act as an adhesive when it is fully cured by heat or other means during later processing. After the cured coated strip 25*a*' leaves the curing station 30 it may be cooled if necessary at cooling station 32 before it is coiled for handling on a take up roll 34.

The production line concept disclosed herein combines several innovated processes and has the advantages that the overall line is relatively compact and labor is minimized. The handling and damage to strip material between separate stand alone processes is eliminated. Work and process inventory between separate stand alone processes is also eliminated and change over from production of one size strip to another is minimal. The coated strip has high conductivity and has rounded edges. The insulating coating can be controlled to a minimal thickness. While the vacuum application system has been described as producing a coating pattern such as shown in FIGS. 1–5, it is to be understood that the vacuum application system is capable of producing coatings of other patterns. It is also to be understood that the present method of coating strip material may also be used without being in tandem with the Conform apparatus. The present method is applicable to coating either aluminum or copper strip material having rounded edges.

While there has been described a preferred embodiment of the invention, it will be understood that further modifications may be made without departing from the spirit and scope of the invention as set forth in the appended claims.

What is claimed is:

1. In a system for extrusion of a flat metallic strip of conductive material for winding into a magnet coil, said flat strip having a predetermined thickness and first and second sides bounded by a pair of rounded edges, the method of insulating the strip of conductive material comprising supporting the flat strip in a level state at a predetermined temperature in a vacuum chamber, while in the vacuum chamber applying a liquid coating of resin to the entire first side of said strip and said pair of rounded edges and extending onto said second side of said strip from each of said edges a distance at least as great as to prevent turn to turn discharge, applying a liquid coating of resin to the second side of said strip at a plurality of spaced areas between the coating extending around said edges, controlling the placement of the resin coating on the strip, controlling the thickness of the resin coating applied to the surfaces of the strip, and curing the liquid coating of resin.

2. A method of insulating the strip of conductive material according to claim 1 wherein said flat strip is preheated to a temperature not greater than about 150° F.

3. The method of insulating the strip of conductive material according to claim 2 wherein the step of curing the liquid resin comprises exposing the liquid resin coating to ultraviolet radiation.

4. The method of insulating the strip of conductive material according to claim 2 wherein the step of curing the liquid resin comprises exposing the liquid resin coating to an electron beam.

5. A method of insulating a strip of conductive material according to claim 1 wherein the placement of the liquid resin coating on the strip is controlled by masks.

6. A method of insulating the strip of conductive material according to claim 1 wherein the thickness of the liquid resin coating applied to the surfaces of the strip is controlled by controlling the level of vacuum inside the vacuum chamber.

7. A method of insulating the strip of conductive material according to claim 6 wherein the thickness of the liquid resin coating applied to the surfaces of the strip is controlled by controlling the level of vacuum inside the vacuum chamber, controlling the speed of the strip through the vacuum chamber, and controlling the clearance around the flat strip where it exits the chamber.

8. A method of insulating the strip of conductive material according to claimed 6 wherein the resin coating is controlled to a thickness from about 0.00025" to about 0.00150".

9. A method of insulating the strip of conductive material according to claim 1 wherein the vacuum chamber is maintained at a predetermined pressure below atmospheric so that excess liquid resin coating is pulled off of the strip as the strip exits the vacuum chamber.

10. A method of insulating the strip of conductive material according to claim 1 including the step of winding the coated strip into a coil.

11. A method of insulating the strip of conductive material according to claim 1 wherein the liquid coating of resin extends onto the second side of said strips from each of said edges a distance at least as great as 0.25".

12. In a system for insulating a flat metallic strip of conductive material for winding onto a magnet coil, said flat strip having a predetermined thickness and first and second sides bounded by a pair of rounded edges, the method comprising supporting the flat strip in a level state, preheating the strip to a predetermined temperature, passing the strip into a vacuum chamber, while in the vacuum chamber applying a liquid coating of resin to the entire first side of said strip and said pair of rounded edges and extending onto said second side of said strip from each of said edges a distance at least as great as 0.25", controlling the placement of the resin coating on the strip, controlling the thickness of the resin coating applied to the surfaces of the strip, and curing the liquid coating of resin.

13. A method of insulating the strip of conductive material according to claim 12 wherein said flat strip is preheated to a temperature from about 100° F. to about 150° F.

14. A method of insulating the strip of conductive material according to claim 12 wherein said flat strip is aluminum.

15. A method of insulating the strip of conductive material according to claim 12 wherein said flat strip is copper.

* * * * *

UNITED STATES PATENT AND TRADEMARK OFFICE
CERTIFICATE OF CORRECTION

PATENT NO. : 5,980,995

DATED : November 9, 1999

INVENTOR(S) : Thomas L. Linsenbardt et al.

It is certified that error appears in the above-identified patent and that said Letters Patent is hereby corrected as shown below:

Col. 1, line 2, replace "filed February 19, 1997" with --filed February 19, 1997, now U.S. Patent 5,904,953 issued May 18, 1999--.

Col. 7, line 7 (claim 8), "according to claimed 6" should read --according to claim 6--.

Signed and Sealed this

Ninth Day of May, 2000

Attest:

Q. TODD DICKINSON

*Attesting Officer*   *Director of Patents and Trademarks*